US010095486B2

(12) United States Patent
Findlay et al.

(10) Patent No.: US 10,095,486 B2
(45) Date of Patent: Oct. 9, 2018

(54) SOFTWARE APPLICATION DEVELOPMENT TOOL

(75) Inventors: Denise Findlay, Middlesex (GB); Michael Joseph Attar, Long Island, NY (US); Eric William Euler, Long Island, NY (US); Cory Allan Serratore, Ontario (CA); Lissy Elias, Atlanta, GA (US); Leonardo Granado Valente, Long Island, NY (US); Gabor Janos Lestyan, Toronto (CA); John Martin Flenley, Middlesex (GB)

(73) Assignee: SITA INFORMATION NETWORKING COMPUTING IRELAND LIMITED, Letterkenny (IE)

( * ) Notice: Subject to any disclaimer, the term of this patent is extended or adjusted under 35 U.S.C. 154(b) by 539 days.

(21) Appl. No.: 13/581,182

(22) PCT Filed: Feb. 25, 2011
(Under 37 CFR 1.47)

(86) PCT No.: PCT/EP2011/052855
§ 371 (c)(1),
(2), (4) Date: Mar. 21, 2014

(87) PCT Pub. No.: WO2011/104367
PCT Pub. Date: Sep. 1, 2011

(65) Prior Publication Data
US 2015/0309770 A1    Oct. 29, 2015

Related U.S. Application Data

(60) Provisional application No. 61/308,208, filed on Feb. 25, 2010.

(30) Foreign Application Priority Data

Jun. 8, 2010    (GB) .................................. 1009606.3

(51) Int. Cl.
G06F 9/44    (2018.01)
G06F 8/34    (2018.01)

(52) U.S. Cl.
CPC ...................................... *G06F 8/34* (2013.01)

(58) Field of Classification Search
CPC ......................................................... G06F 8/34
(Continued)

(56) References Cited

U.S. PATENT DOCUMENTS 4,821,118 A    4/1989    Lafreniere
5,270,921 A    12/1993    Hornick
(Continued)

FOREIGN PATENT DOCUMENTS

AU    2002317935 A1    1/2003
CN    101436185 A     5/2009
(Continued)

OTHER PUBLICATIONS

Kinneging, T., Machine Readable Travel Documents—Technical Report: PKI for Machine Readable Travel Documents Offering ICC Read-Only Access, PKI Task Force, International Civil Aviation Organization, Version 1.1, Oct. 1, 2004.
(Continued)

*Primary Examiner* — Hang Pan
(74) *Attorney, Agent, or Firm* — Morris, Manning & Martin, LLP; Daniel E. Sineway, Esq.; R. Lee Strasburger, Jr., Esq.

(57) ABSTRACT

A software development tool for use with external systems and services uses a common code base and defines all data and messages using XML Schema System components are defined which include a device abstraction layer which handles interactions between the application and devices. A host abstraction layer handles interactions between a host system and the application. A graphical tool models the work
(Continued)

flow of the application and includes screens and services defined by Schema. The application is assembled using the graphical tool, declarative XML rules and customizations of system components without the user having to generate any coding.

42 Claims, 4 Drawing Sheets

(58) Field of Classification Search
USPC .......................................................... 717/109
See application file for complete search history.

(56) References Cited

U.S. PATENT DOCUMENTS

| | | |
|---|---|---|
| 5,748,850 A | 5/1998 | Sakurai |
| 5,793,639 A | 8/1998 | Yamazaki |
| 5,897,620 A | 4/1999 | Walker |
| 5,918,209 A | 6/1999 | Campbell et al. |
| 6,044,353 A | 3/2000 | Pugliese, III |
| 6,108,636 A | 8/2000 | Yap et al. |
| 6,112,185 A | 8/2000 | Walker et al. |
| 6,158,658 A | 12/2000 | Barclay |
| 6,192,416 B1 | 2/2001 | Baxter |
| 6,259,405 B1 | 7/2001 | Stewart |
| 6,367,016 B1 | 4/2002 | Lambert et al. |
| 6,414,635 B1 | 7/2002 | Stewart |
| 6,473,704 B1 | 10/2002 | Ito et al. |
| 6,553,336 B1 | 4/2003 | Johnson |
| 6,661,340 B1 | 12/2003 | Saylor et al. |
| 6,695,203 B2 | 2/2004 | Iki et al. |
| 6,735,630 B1 | 5/2004 | Gelvin |
| 6,736,322 B2 | 5/2004 | Gobburu |
| 6,757,712 B1 | 6/2004 | Bastian et al. |
| 6,758,394 B2 | 7/2004 | Maskatiya |
| 6,760,778 B1 | 7/2004 | Nelson et al. |
| 6,869,023 B2 | 3/2005 | Hawes et al. |
| 6,972,682 B2 | 12/2005 | Lareau |
| 7,027,808 B2 | 4/2006 | Wesby |
| 7,035,828 B2 | 4/2006 | Ketonen et al. |
| 7,212,978 B2 | 5/2007 | Kowal et al. |
| 7,258,276 B2 | 8/2007 | Linton et al. |
| 7,275,689 B2 | 10/2007 | Mak |
| 7,327,262 B2 | 2/2008 | Motteram et al. |
| 7,421,319 B2 | 9/2008 | Stefani |
| 7,440,967 B2 | 10/2008 | Chidlovskii |
| 7,454,203 B2 | 11/2008 | Levitan |
| 7,483,696 B1 | 1/2009 | Mitchell |
| 7,486,171 B2 | 2/2009 | Kim |
| 7,486,960 B2 | 2/2009 | Brady et al. |
| 7,539,985 B2 | 5/2009 | Marvin |
| 7,571,206 B2 | 8/2009 | Koning et al. |
| 7,599,847 B2 | 10/2009 | Block |
| 7,607,080 B2 | 10/2009 | Heuer et al. |
| 7,664,672 B1 | 2/2010 | Walker et al. |
| 7,668,873 B2 | 2/2010 | Davis et al. |
| 7,685,009 B2 | 3/2010 | Halavais et al. |
| 7,702,328 B2 | 4/2010 | Lemond et al. |
| 7,720,724 B2 | 5/2010 | Kurashige |
| 7,739,292 B2 | 6/2010 | Falk et al. |
| 7,786,899 B2 | 8/2010 | Baker et al. |
| 7,805,523 B2 | 9/2010 | Mitchell et al. |
| 7,870,101 B2 | 1/2011 | Hubbard et al. |
| 7,882,137 B2 | 2/2011 | Lepman |
| 7,907,067 B2 | 3/2011 | Baker et al. |
| 7,907,545 B2 | 3/2011 | Ric |
| 7,949,335 B2 | 5/2011 | Stefani et al. |
| 7,954,712 B2 | 6/2011 | Babcock et al. |
| 8,001,519 B2 | 8/2011 | Conallen et al. |
| 8,058,972 B2 | 11/2011 | Mohanty |
| 8,087,583 B2 | 1/2012 | Hawes |
| 8,090,603 B2 | 1/2012 | Payne et al. |
| 8,117,051 B2 | 2/2012 | Sauvage et al. |
| 8,160,759 B2 | 4/2012 | Baker et al. |
| 8,165,809 B1 | 4/2012 | Baker et al. |
| 8,170,535 B1 | 5/2012 | Lopes et al. |
| 8,195,151 B2 | 6/2012 | Cerra, II et al. |
| 8,214,144 B2 | 7/2012 | Baker et al. |
| 8,229,458 B2 | 7/2012 | Busch |
| 8,296,281 B2 | 10/2012 | Baker et al. |
| 8,332,136 B2 | 12/2012 | Baker et al. |
| 8,467,726 B2 | 6/2013 | Shirakata |
| 8,509,441 B2 | 8/2013 | Yoon |
| 8,521,681 B2 | 8/2013 | Ouchi |
| 8,606,508 B2 | 12/2013 | Baker et al. |
| 8,631,358 B2 | 1/2014 | Louch |
| 8,665,238 B1 | 3/2014 | Gossweiler, III |
| 8,671,009 B1 | 3/2014 | Coley et al. |
| 8,700,236 B1 | 4/2014 | Berman |
| 8,713,661 B2 | 4/2014 | Vysogorets et al. |
| 8,949,142 B1 | 2/2015 | Angrish |
| 8,977,568 B1 | 3/2015 | Schattauer |
| 9,024,752 B2 | 5/2015 | Tumayan |
| 9,026,461 B2 | 5/2015 | Calman |
| 9,047,512 B2 | 6/2015 | Otis |
| 9,134,955 B2 | 9/2015 | Healey |
| 9,141,325 B2 | 9/2015 | Dersy |
| 9,239,246 B2 | 1/2016 | Jones |
| 9,275,550 B1 | 3/2016 | Stefani |
| 9,541,632 B2 | 1/2017 | Frank |
| 9,552,564 B1 | 1/2017 | Martenis |
| 9,589,262 B2 | 3/2017 | Graylin |
| 9,589,405 B2 | 3/2017 | Cabouli |
| 9,599,989 B1 | 3/2017 | Brown |
| 9,710,920 B2 | 7/2017 | Utsunomiya |
| 9,749,831 B2 | 8/2017 | Lee |
| 2001/0044738 A1 | 11/2001 | Elkin et al. |
| 2002/0138184 A1 | 9/2002 | Kipersztok et al. |
| 2002/0138625 A1 | 9/2002 | Bruner et al. |
| 2002/0160773 A1 | 10/2002 | Gresham et al. |
| 2003/0034390 A1 | 2/2003 | Linton et al. |
| 2003/0048471 A1 | 3/2003 | Lundgren |
| 2003/0093187 A1 | 5/2003 | Walker |
| 2003/0111530 A1 | 6/2003 | Iki et al. |
| 2003/0130769 A1 | 7/2003 | Farley et al. |
| 2003/0146871 A1 | 8/2003 | Karr et al. |
| 2003/0150922 A1 | 8/2003 | Hawes |
| 2003/0220116 A1 | 11/2003 | Sagefalk et al. |
| 2004/0030855 A1 | 2/2004 | Takeuchi et al. |
| 2004/0039617 A1 | 2/2004 | Maycotte et al. |
| 2004/0128193 A1 | 7/2004 | Brice et al. |
| 2004/0249836 A1 | 12/2004 | Reynders et al. |
| 2005/0004919 A1 | 1/2005 | Green et al. |
| 2005/0033666 A1 | 2/2005 | Kurashige |
| 2005/0071206 A1 | 3/2005 | Berge |
| 2005/0228702 A1 | 10/2005 | Fairbanks et al. |
| 2005/0258230 A1 | 11/2005 | Wiater |
| 2005/0258247 A1 | 11/2005 | Hawes |
| 2006/0004590 A1 | 1/2006 | Khoo |
| 2006/0004781 A1 | 1/2006 | Burgel et al. |
| 2006/0036677 A1* | 2/2006 | Stout ..................... G06F 3/0236 709/203 |
| 2006/0053056 A1 | 3/2006 | Alspach-Goss et al. |
| 2006/0075934 A1 | 4/2006 | Ram |
| 2006/0085451 A1 | 4/2006 | Pal et al. |
| 2006/0095434 A1 | 5/2006 | McCullough et al. |
| 2006/0097046 A1 | 5/2006 | Fassio et al. |
| 2006/0173680 A1 | 8/2006 | Verhasselt et al. |
| 2006/0206246 A1 | 9/2006 | Walker |
| 2006/0234700 A1 | 10/2006 | Funderburk et al. |
| 2006/0238384 A1 | 10/2006 | Hess et al. |
| 2006/0259456 A1 | 11/2006 | Falk et al. |
| 2006/0277231 A1* | 12/2006 | Kral ........................ G06F 8/70 708/102 |
| 2006/0288021 A1 | 12/2006 | Kojima |
| 2007/0011334 A1 | 1/2007 | Higgins et al. |
| 2007/0055416 A1 | 3/2007 | Allen |
| 2007/0072590 A1 | 3/2007 | Levitan |
| 2007/0111725 A1 | 5/2007 | Kauffman et al. |
| 2007/0127460 A1 | 6/2007 | Wilber et al. |
| 2007/0133487 A1 | 6/2007 | Wang et al. |
| 2007/0149216 A1 | 6/2007 | Misikangas |
| 2007/0157078 A1 | 7/2007 | Anderson |

(56) References Cited

U.S. PATENT DOCUMENTS

| | | |
|---|---|---|
| 2007/0198314 A1 | 8/2007 | Andrew et al. |
| 2007/0203796 A1 | 8/2007 | Riggs |
| 2007/0222595 A1 | 9/2007 | Motteram et al. |
| 2007/0233617 A1 | 10/2007 | Gillespie |
| 2007/0244766 A1 | 10/2007 | Goel |
| 2007/0250356 A1 | 10/2007 | Douglas |
| 2007/0265881 A1 | 11/2007 | El Elman et al. |
| 2007/0273514 A1 | 11/2007 | Winand et al. |
| 2008/0010005 A1 | 1/2008 | Small et al. |
| 2008/0015926 A1 | 1/2008 | De Marcken |
| 2008/0027765 A1 | 1/2008 | Gunn et al. |
| 2008/0027955 A1 | 1/2008 | May et al. |
| 2008/0046298 A1 | 2/2008 | Ben-Yehuda et al. |
| 2008/0065480 A1 | 3/2008 | Baker et al. |
| 2008/0070517 A1 | 3/2008 | Brady et al. |
| 2008/0091445 A1 | 4/2008 | Mihic |
| 2008/0099552 A1 | 5/2008 | Grillion |
| 2008/0140226 A1 | 6/2008 | Ganev |
| 2008/0140434 A1 | 6/2008 | O'Brien |
| 2008/0224823 A1 | 9/2008 | Lawson et al. |
| 2008/0229228 A1 | 9/2008 | Cohen |
| 2009/0010200 A1 | 1/2009 | Lauer et al. |
| 2009/0015398 A1 | 1/2009 | Bhogal et al. |
| 2009/0030781 A1 | 1/2009 | Mehta et al. |
| 2009/0033491 A1 | 2/2009 | Saunders |
| 2009/0063219 A1 | 3/2009 | Raufaste et al. |
| 2009/0070841 A1 | 3/2009 | Buga et al. |
| 2009/0081947 A1 | 3/2009 | Margis |
| 2009/0112473 A1 | 4/2009 | Lu et al. |
| 2009/0164500 A1 | 6/2009 | Mathur et al. |
| 2009/0182590 A1 | 7/2009 | Ashby et al. |
| 2009/0187494 A1 | 7/2009 | Heath |
| 2009/0196201 A1 | 8/2009 | Ric |
| 2009/0248457 A1 | 10/2009 | Munter et al. |
| 2009/0256675 A1 | 10/2009 | Kerr |
| 2009/0259549 A1 | 10/2009 | Winand et al. |
| 2009/0266882 A1 | 10/2009 | Sajkowsky |
| 2009/0287513 A1 | 11/2009 | Anderson et al. |
| 2009/0288123 A1 | 11/2009 | Havlovick et al. |
| 2009/0307020 A1 | 12/2009 | Viale et al. |
| 2009/0310530 A1 | 12/2009 | Cerra, II et al. |
| 2009/0313601 A1* | 12/2009 | Baird ................ G06F 8/34 717/106 |
| 2010/0027461 A1 | 2/2010 | Bothorel |
| 2010/0030591 A1 | 2/2010 | Viard et al. |
| 2010/0065632 A1 | 3/2010 | Babcock et al. |
| 2010/0076795 A1 | 3/2010 | Steir et al. |
| 2010/0076826 A1 | 3/2010 | Bayne |
| 2010/0078475 A1 | 4/2010 | Lin et al. |
| 2010/0102934 A1 | 4/2010 | Guichard |
| 2010/0159871 A1 | 6/2010 | Tester |
| 2010/0190510 A1 | 7/2010 | Maranhas et al. |
| 2010/0191782 A1 | 7/2010 | Brzozowski |
| 2010/0198628 A1 | 8/2010 | Rayner |
| 2010/0205448 A1 | 8/2010 | Tarhan et al. |
| 2010/0245034 A1 | 9/2010 | D'Oliveiro et al. |
| 2010/0268656 A1 | 10/2010 | Teicher |
| 2010/0332358 A1 | 12/2010 | Owens |
| 2011/0004832 A1 | 1/2011 | Canal et al. |
| 2011/0018769 A1 | 1/2011 | Misikangas et al. |
| 2011/0028160 A1 | 2/2011 | Roeding et al. |
| 2011/0119183 A1* | 5/2011 | Berman ............ G06Q 20/1085 705/43 |
| 2011/0227737 A1 | 9/2011 | Kamins |
| 2012/0011067 A1* | 1/2012 | Katzin ................ G06Q 20/027 705/44 |
| 2012/0035965 A1 | 2/2012 | Maguire et al. |
| 2012/0041313 A1 | 2/2012 | Tanaka |
| 2012/0042263 A1 | 2/2012 | Rapaport et al. |
| 2012/0042371 A1 | 2/2012 | Gur et al. |
| 2012/0075168 A1 | 3/2012 | Osterhout et al. |
| 2012/0101885 A1 | 4/2012 | Lee et al. |
| 2012/0123844 A1 | 5/2012 | Fano et al. |
| 2012/0129546 A1 | 5/2012 | Yang et al. |
| 2012/0200390 A1 | 8/2012 | Saravanan |
| 2012/0203578 A1 | 8/2012 | Baggett et al. |
| 2012/0284108 A1 | 11/2012 | Fontana et al. |
| 2013/0069985 A1 | 3/2013 | Wong et al. |
| 2013/0141313 A1 | 6/2013 | Zhou et al. |
| 2013/0211864 A1 | 8/2013 | Sanderson et al. |
| 2013/0234849 A1 | 9/2013 | Gupta et al. |
| 2013/0267255 A1 | 10/2013 | Liu et al. |
| 2013/0295966 A1 | 11/2013 | Dingler et al. |
| 2013/0297103 A1 | 11/2013 | Baker et al. |
| 2013/0314257 A1 | 11/2013 | MacRae et al. |
| 2013/0325526 A1 | 12/2013 | Tyler |
| 2014/0006070 A1 | 1/2014 | Stamler |
| 2014/0012640 A1 | 1/2014 | Roberts et al. |
| 2014/0039717 A1 | 2/2014 | Henkel |
| 2014/0052482 A1 | 2/2014 | Le Marier et al. |
| 2014/0067244 A1 | 3/2014 | Baker et al. |
| 2014/0075506 A1 | 3/2014 | Davis et al. |
| 2014/0123315 A1 | 5/2014 | Baker et al. |
| 2014/0188311 A1 | 7/2014 | Masson |
| 2014/0223043 A1 | 8/2014 | Dersy |
| 2016/0152350 A1 | 6/2016 | Puentes |
| 2016/0180255 A1 | 6/2016 | Goedemondt |
| 2017/0004444 A1 | 1/2017 | Krasko |
| 2017/0032263 A1 | 2/2017 | Yuan |

FOREIGN PATENT DOCUMENTS

| | | |
|---|---|---|
| DE | 10357831 A1 | 7/2005 |
| DE | 102009020228 A1 | 11/2010 |
| EP | 1069501 A2 | 1/2001 |
| EP | 1308864 A1 | 5/2003 |
| EP | 1318463 A1 | 6/2003 |
| EP | 0770546 B1 | 12/2003 |
| EP | 1454306 A2 | 9/2004 |
| EP | 1 610 094 A1 | 12/2005 |
| EP | 1679624 A2 | 7/2006 |
| EP | 1874001 B1 | 1/2008 |
| EP | 2088543 A1 | 8/2009 |
| EP | 2088569 A1 | 8/2009 |
| EP | 2222053 A1 | 8/2010 |
| EP | 2290600 A2 | 3/2011 |
| EP | 2362354 A2 | 8/2011 |
| EP | 2 390 845 A1 | 11/2011 |
| EP | 2474931 A1 | 7/2012 |
| EP | 2932902 B1 | 12/2016 |
| EP | 1872294 B1 | 11/2017 |
| GB | 2366945 A | 3/2002 |
| GB | 2408131 B | 3/2006 |
| GB | 2418511 A | 3/2006 |
| GB | 2469026 A | 10/2010 |
| GB | 2470897 A | 12/2010 |
| GB | 2501144 A | 10/2013 |
| JP | 2003157984 A | 5/2003 |
| JP | 2005135199 A | 5/2005 |
| JP | 2006053724 A | 2/2006 |
| JP | 2008117340 A | 5/2008 |
| JP | 2008171181 A | 7/2008 |
| JP | 2009093603 A | 4/2009 |
| JP | 2017129981 A | 7/2017 |
| WO | 200073954 A2 | 12/2000 |
| WO | 200135269 A2 | 5/2001 |
| WO | 200135289 A1 | 5/2001 |
| WO | 03005237 A1 | 8/2001 |
| WO | 2001057323 A1 | 8/2001 |
| WO | 2001069431 A2 | 9/2001 |
| WO | 0215582 A1 | 2/2002 |
| WO | 2004045106 A1 | 3/2004 |
| WO | 2006010774 A1 | 2/2006 |
| WO | 2007113844 A1 | 10/2007 |
| WO | 2007147207 A1 | 12/2007 |
| WO | 2008/055181 A2 | 5/2008 |
| WO | 2009002139 A1 | 12/2008 |
| WO | 2009021068 A1 | 2/2009 |
| WO | 2009058505 A1 | 5/2009 |
| WO | 2009091553 A1 | 7/2009 |
| WO | 2011057323 A1 | 5/2011 |
| WO | 2011088233 A1 | 7/2011 |

(56) References Cited

FOREIGN PATENT DOCUMENTS

| WO | 2012106075 A1 | 8/2012 |
|---|---|---|
| WO | 2012105829 A3 | 9/2012 |
| WO | 2013079512 A1 | 6/2013 |

OTHER PUBLICATIONS

International Search Report and the Written Opinion of the International Search Authority (EPO) for PCT/EP2013/057497 dated Jun. 27, 2013.
Susan Stellin, "Automation is Considered for Checking IDs in Airports", Business Day, The New York Times, Mar. 19, 2012, 3 pages, retrieved Sep. 4, 2014, http://www.nytimes.com/2012/03/20/business/tsa-is-considering-automating-id-checks.html.
Robert Longley, "TSA's New ID, Boarding Pass Scanning System Draws Criticism", US Government, About.com, Aug. 2, 2012, 2 pages, retrieved online on Jul. 30, 2014, http://usgovinfo.about.com/od/defenseandsecurity/a/Tsa-Boarding-Pass-Scanning-System-Draws-Criticism.htm#&newsissues&newsissues.
Search Report of Application No. GB 1403967.1, received from the UK Intellectual Property Office dated Aug. 4, 2014.
Examination Opinion of Application No. GB 1403967.1, received from the UK Intellectual Property Office dated Aug. 5, 2014.
Search Report of Singapore Application No. 201306353-2, received from the Danish Patent and Trademark Office dated Jun. 16, 2014.
Written Opinion of Singapore Application No. 201306353-2, received from the Danish Patent and Trademark Office dated Jun. 16, 2014.
Sam Schechner, "Airlines Entertain Tablet Ideas—Rather Than Wiring Planes for In-Flight Movies, Some Hand Out iPads", http://online.wsj.com/articles/SB10000872396390443916104578020601759253578, Sep. 2012.
Mary Kirby, "Personal Services—In-flight connectivity poised to change the passenger experience for ever", http://www.flightglobal.com/news/articles/personal-services-in-flight-connectivity-poised-to-change-the-passenger-experience-for-332765/, Sep. 2009.
Lawrence Kitson, "The Future of In-flight: Part Two—The Concierge Concept", http://ustwo.com/blog/the-future-of-in-flight-part-two-the-concierge-concept/, Apr. 2012.
Examination Report of Malaysian Application No. 2013001405, received from the Intellectual Property Corporation of Malaysia dated Oct. 28, 2014.
International Civil Aviation Organization, Machine Readable Travel Documents, Part 1, Machine Readable Passports—vol. 1, Specifications for Electronically Enabled Passports with Biometric Identification Capability, Sixth Edition, 99 pages, 2006.
International Civil Aviation Organization, Machine Readable Travel Documents, Part 1, Machine Readable Passports—vol. 2, Passports with Machine Readable Data Stored in Optical Character Recognition Format, Sixth Edition, 131 pages, 2006.
International Civil Aviation Organization, Machine Readable Travel Documents, Part 3, Machine Readable Official Travel Documents—vol. 1, MRtds with Machine Readable Data Stored in Optical Character Recognition Text International Civil Aviation Organization, Third Edition, 122 pages, 2008.
International Civil Aviation Organization, Machine Readable Travel Documents, Part 3, Machine Readable Official Travel Documents—vol. 2, Specifications for Electronically Enabled MRtds with Biometric Identification Capability, Third Edition, 149 pages, 2008.
Dunkel, Jürgen, et al., Model-Driven Architecture for Mobile Applications, pp. 464-477, 2007, Hannover University of Applied Sciences and Arts, Department of Computer Sciences, Hannover Germany.
Glushko, Robert J., et al., Bridging the "Front Stage" and "Back Stage" in Service System Design, pp. 1-10, 2008, University of California, Berkely, School of Information, Proceedings of the 41st Hawaii International Conference on System Sciences, Institute of Electrical and Electronics Engineers (IEEE).
Li, Quanzhong, et al., XVM: A Bridge Between XML Data and Its Behavior, 9 pages, May 17-22, 2004, 13th International Conference on World Wide Web, New York, New York, USA.
Madria, Sanjay, An XML Schema Integration and Query Mechanism System, pp. 266-303, 2007, Elsevier B.V., Science Direct, Data & Knowledge Engineering 65 (2008).
McGuire, Kelly A., et al., The Future of Revenue Management, 5 pages, 2009, SAS Global Forum 2009, SAS Institute, Inc.
Smith, Barry C., et al., Yield Management at American Airlines, pp. 8-31, 1992, American Airlines Decision Technologies, Dallas/Fort Worth Airport, Texas, USA.
Xu, Liping, et al., A Model of Capacity Control with Overbooking for a Two-leg Airlines Network, 5 pages, 2008, Institute of Electrical and Electronics Engineers (IEEE).
AIRCOM Server Administrator Guide, SITA Airline Telecommunications and Information Services, Feb. 19, 2013, pp. 1-280.
AIRCOM Server User Guide, SITA Airline Telecommunications and Information Services, Jan. 24, 2013, pp. 1-153.
International Search Report and the Written Opinion mailed in International Application No. PCT/EP2013/052590 filed Aug. 2, 2013.
International Search Report and Written Opinion mailed in International Application No. PCT/EP2011/070551 filed Nov. 21, 2011.
International Search Report and Written Opinion mailed in International Application No. PCT/EP2014/062464 filed Jun. 13, 2014.
International Search Report and Written Opinion mailed in International Application No. PCT/EP2015/053319 filed Feb. 17, 2015.
International Search Report mailed in International Application No. PCT/EP2011/072286 filed on Sep. 12, 2011.
Search Report and Written Opinion of Singapore Application No. 201301980-7, dated Sep. 3, 2013.
Written Opinion mailed in Singapore Application No. 201301978-1, dated Oct. 15, 2013.
Marmesse, M., et al., Location-aware Information Delivery with comMotion, MIT Media Laboratory, Cambridge, MA, HUC 2000 Proceedings, pp. 157-171, Springer-Verlag.
Munoz, M., et al., Context-Aware Mobile Communication in Hospitals, IEEE Computer Society, Sep. 2003.
Schwinger, W., et al., Context-Aware in Mobile Tourism Guides—A Comprehensive Survey, Austrian Federal Ministry for Education, Science, and Culture, and the European Social Fund, 2002.
Russian Search Report for 2013133853/08(050668) dated Feb. 20, 2015. Receipt date: Jun. 16, 2015.
Belobaba, Fundamentals of Pricing and Revenue Management, The Global Airline Industry, 2009.
Caliendo, et al., Social Networks, Job Search Methods and Reservation Wages: Evidence for Germany, IZA, Sep. 2010, Germany.
Glaser-Opitz, et al., Evaluation of CPDLC and Voice Communication During Approach Phase, Digital Avionics Conference, Sep. 13-17, 2015.
Hull, et al., Technology-Enabled Airborne Spacing and Merging, Digital Avionics Systems Conference, 2004.
International Examination Report mailed in Australian Application No. 2011347893 dated Sep. 11, 2015.
International Search Report and Written Opinion mailed in International Application No. PCT/EP2014/055037 filed Mar. 13, 2014.
International Search Report and Written Opinion mailed in International Application PCT/EP2015/068682 dated Oct. 29, 2015.
International Search Report and Written Opinion mailed in Singapore Application No. 11201404575U dated Jun. 16, 2015.
Kenney, et al., Secure ATC Surveillance for Military Applications, Military Communications Conference, 2008.
Lee, et al., Effectiveness of the Ground-Based Transceiver (GBT) Parrot System for Monitoring GPS Integrity for Alaska ATC "Radar-Like Services" Using ADS-B, Digital Avionics Systems Conference, 2004.
Search Report and Written Opinion dated Apr. 2, 2014 in GB Application No. 1317659.9.
Johnston, et al., Multimodal Applications from Mobile to Kiosk, 2004, pp. 1-4.
Kindervater, Revenue Management in the Airline Passenger Industry, 2007, pp. 1-24, Lunteren.

(56) References Cited

OTHER PUBLICATIONS

Search Report and Examination Opinion dated May 19, 2015 in International Application No. GB1421313.6.
Examination Report dated Apr. 28, 2014 in Malaysian Application No. PI 2013000936.

* cited by examiner

SOFTWARE APPLICATION DEVELOPMENT TOOL

CROSS-REFERENCE TO RELATED APPLICATIONS

This application is a U.S. national phase application and claims the benefit of and priority under 35 U.S.C. §§ 119, 120 to U.S. Provisional Patent Application Ser. No. 61/308,208, filed Feb. 25, 2010, entitled "Software Application Development Tool", by Denise Findlay et al., to Great Britain Patent Application No. 1009606.3, filed Jun. 8, 2010, entitled "Graphical Development Tool for Software Application Development", by Denise Findlay et al., and to International Patent Application No. PCT/EP2011/052855, filed Feb. 25, 2011, entitled "Software Application Development Tool", by Denise Findlay et al., the disclosures of which are incorporated herein by reference as if set forth herein in their entireties.

FIELD OF THE INVENTION

This invention relates to the development of software applications systems for use with systems that communicate with a variety of different external systems.

BACKGROUND TO THE INVENTION

In the airline industry there are many common functions that must be performed by all airlines such as baggage handling, and check-in. Some of these functions, such a check-in are gradually being moved to a self-service channel where the action is performed by the passenger or customer rather than the airline. In the case of check-in, the function may be performed on-line, at designated self-service kiosks at an airport, or through the traditional airline check-in desk where the passenger will be checked-in by an airline representative. It is anticipated that check-in via a mobile phone or other pda will become available in the near future.

Thus there is a plurality of channels though which a check-in service may be delivered. The basic function is the same for all airports and airlines although every airline and every airport has its own business requirements and rules and may require enhanced functionality such as self-bag tagging, and revenue generating opportunities such as ancillary revenue and targeted marketing.

Over the years individual code bases have been developed by each airline and each airport to handle check-in such that there is now an almost one to one relationship between applications and code bases. This is highly inefficient and requires support and maintenance and long certification cycles. It is also difficult to enhance and develop existing systems as the airlines must revert back to the original developers to write changes to the original code bases. It presents particular problems for airlines as they are required to use different code streams for different modes of check-in. It also creates difficulties for airports who have to work with multiple airlines, each of which may have its own set of code bases. It further creates difficulties for suppliers who have to provide support and maintenance for a large variety of incompatible code bases.

This problem is not confined to check-in but is also present in other areas where different systems have evolved to handle the same tasks, for example, ticketing and baggage handling.

Although this is a particular problem in the airline industry, it also exists in other fields where a number of parallel implementations of solutions have evolved over years. For example, in different modes of travel and in the entertainment and hospitality industry, particularly in event ticketing and hotel check-in as well as areas such as the financial industry where devices such as ATM machines are often running on a variety of different code bases. The financial self-service industry faces similar issues as the airline industry. There has been a proliferation of channels, and a range of customers from large multi-national to small regional banks, each of whom seek to differentiate themselves via the self service channel while looking for revenue generating opportunities on that channel. The financial industry also faces issues of legacy back-end systems and industry specific devices and device interfaces.

SUMMARY OF THE INVENTION

The invention aims to address these problems to enable systems to be integrated, developed and upgraded in a much more simple and cost effective manner without the need for the original developer to write new code.

According to the invention there is provided a method of developing a software application in which a plurality of devices communicate with external systems and services, the method comprising: providing a common code base; describing data and messages used by the application using a declarative data description language; defining a library of system components including a device abstraction layer for interactions between devices and the application and a host abstraction layer for interactions between a host and the application; providing a graphical (GUI) tool to model the workflow of the application, the workflow including screens and services described declaratively by a declarative data description language; and assembling the application using the graphical tool, declarative rules and customisations of system components selected from the library.

The invention also provides a software application development tool for assembling applications in which a plurality of devices communicate with external systems and services, comprising: data and messages used by the application described using a declarative data description language; A library of system components including a device abstraction layer for interactions between devices and the application and a host abstraction layer for interactions between a host and the application; a graphical (GUI) tool to model the workflow of the application, the workflow including screens and services described declaratively by a declarative data description language; and an assembler for assembling the application using the graphical tool, declarative rules and customisations of the system components selected from the library.

Embodiments of the invention have the advantage that a developer may use the graphical tool to drag and drop devices and functionality which will automatically generate the code for the device or function from a library. This assists the developer in assembling rather than coding the application so reducing the development time and reducing the skill level required by the developer.

The use of a declarative data description language such as XML schemas for the data and messages enables backwards compatibility to be maintained and the data model and/or messages to be extended simply by updating the schemas.

The data and messages may be retrieved from a library or be generated by the developer or a combination of both.

Preferably, high level interfaces are provided to external devices which can be accessed by elements drop and dropped on to pages and having properties set on them.

These pages are preferably specified declaratively and more preferably using an XML language such as XAML.

The host abstraction layer enables the system to be used with a wide range of external systems. In one preferred embodiment, the system is a check-in terminal, for example for an airline. The host abstraction layer enables the system to communicate with a range of different systems used by airlines to hold flight data. Examples include Amadeus and EDS. The host abstraction layer translates messages and protocols from the external system such that they become system non-specific.

The system components may be complex, generic or specific. Generic components are reusable for a domain and may be parametised to increase re-usability.

Although particularly suited to travel systems, particularly check-in systems, embodiments of the invention may be used for many other purposes, for example in the provision of ticketing and admission to venues, such as sporting or entertainment venues. It may also be used in the financial services industry, for example in the control of ATM (Automated Teller Machines) to address problems caused by the large number of code bases used by different banks for their own ATMs.

BRIEF DESCRIPTION OF THE DRAWINGS

Embodiments of the invention will be now be described, by way of example only, and with reference to the accompanying drawings, in which.

In the following description of a preferred embodiment, a system is described which assembles applications from re-usable components without any use of programming language, or coding, by the assembling party. Applications are assembled using a graphical tool which will be described with declarative rules and customizations. The applications built may be adapted or customized declaratively without the need for any coding. This is possible as the applications are built from the same code-base and core product. All data and messages are described declaratively, preferably using XML or similar technologies which allow expansion of the data and messages over time without the need for additional written code.

A preferred embodiment of the invention uses a graphical tool and a schema, preferably an XML or similar schema. The graphical tool models the flow of the application. Screens and services are described using schema which are used by the graphical tool to guide the developer.

XML schemas are used for all data and messages to enable the data model and/or messages to be extended by the user by a simple update of the schema. This may be achieved in a backwards compatible way. As an alternative to XML schemas any declarative data description language may be used. The following description will refer only to XML for simplicity.

The following description is of a self-service check-in kiosk application but this is exemplary and other applications of the invention will be discussed.

Figure 1:
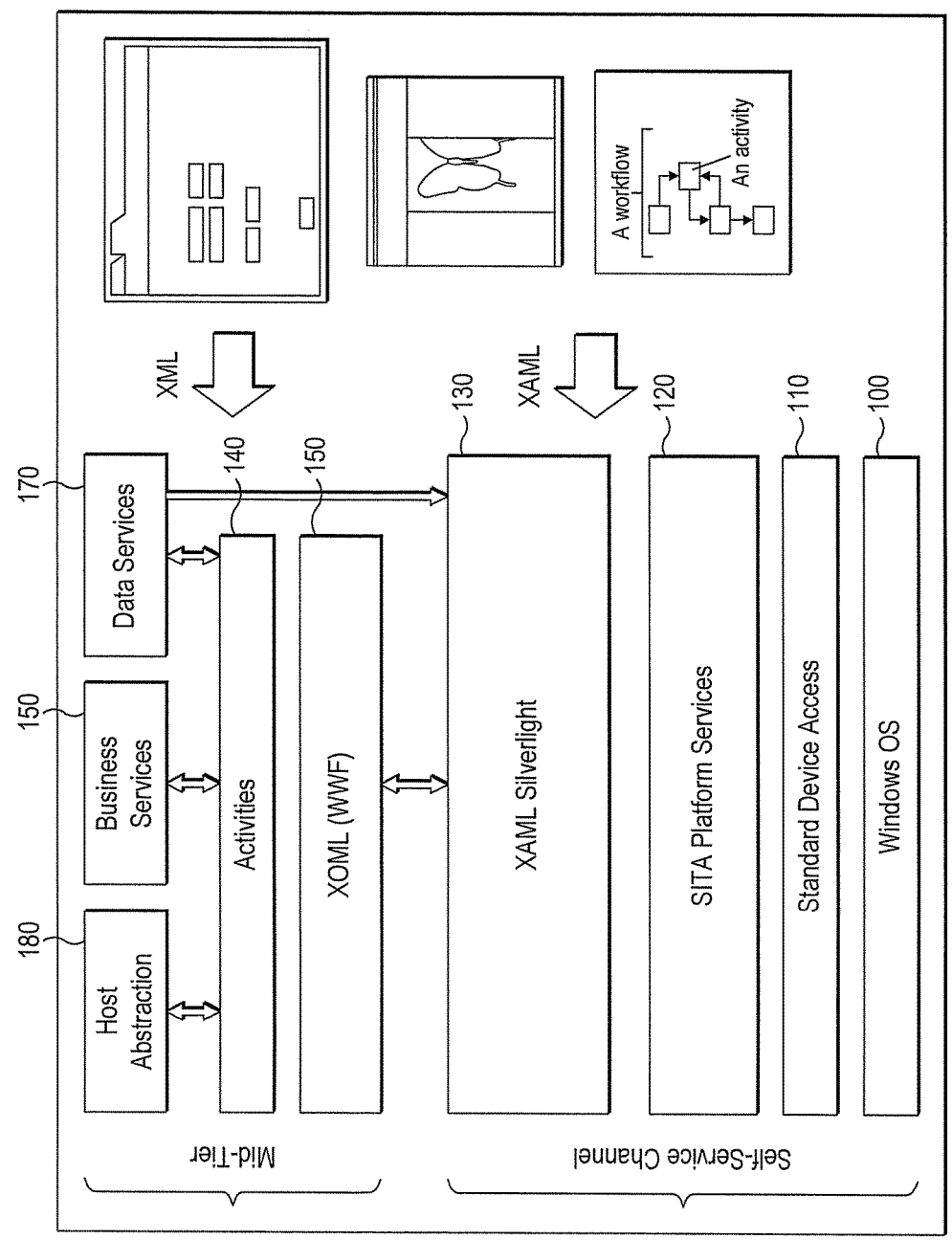
FIG. 1 is a schematic block diagram of a software system embodying the invention.

Referring to FIG. 1 a schematic representation of a kiosk client is shown. The functionality is shown as a number of layers some of which are in the self-service or kiosk channel and some of which are resident at a mid-tier level. It is to be understood that this is exemplary only and that some of the software that is resident at the mid-tier level, for example the XOML layer to be described, could reside on the self-service channel, and vice-versa. A kiosk client is one that handles self-service check-in at an airport. It is to be understood that this description is illustrative only and that within the check-in environment other clients such as on-line web based clients or mobile communications clients would have different platform services, different or no device access layer and a different XAML Silverlight layer.

Airline check-in kiosks use a common standard called CUSS (Common Use Self-Service) which is a standard administered by IATA and seeks to allow multiple airlines to share kiosks to facilitate check-in while maintaining individual airline branding and functionality. Another standard known as CUPPS (Common Use Passenger Processing System) has also been proposed and might be adopted and it is therefore important that the clients can run on either of these platforms or any other platform proposed. Moreover the client should be able to run on both platforms for the duration of any migration period. The client therefore includes a device abstraction layer to protect against platform changes and to allow for migration.

The proposed CUPPS standard also permits agent devices and so components developed for a kiosk, with this standard, could be used for an agent device. An agent device is one used by the airline representative or agent to check in a passenger. In the airline industry agents perform a super-set of the self service tasks. However the host systems and the devices are the same. This solution is a cross-channel solution that also applies to agent (attended) functions. In the financial industry the same conditions apply and therefore the solution could apply also to Teller applications. An example of an application in the financial industry is described later.

In FIG. 1 the kiosk includes a standard Windows® or other operating system 100 and a standard device access layer 110. The abstraction of the platform layer is handled at layer 120 labelled 'SITA Platform services'. The abstraction includes abstraction of the monitor and the application manager of the relevant standard. The platform services layer provides device access in a simple and intuitive manner via Silverlight® controls which can be dragged and propped onto a Silverlight page. The Silverlight layer is represented in FIG. 1 by layer 130. Silverlight is a browser plug-in provided by Microsoft Corporation that facilitates design and development of web based applications and is cross-platform and cross-device. Silverlight uses XAML (Extensible Application Mark-up Language). This provides a very simple and intuitive tool for the application developer.

Silverlight pages are activated as a result of a message from the workflow. The Silverlight pages comprise two parts: code behind that will communicate with the workflow and may include a worker thread which can communicate with the device with the data resources, web services and which may perform some processing; and a screen. The screen is preferably written in XAML but other declaratory languages such as HTML may be supported. A suitable tool for the screen is Expression Blend provided by Microsoft Corporation and which is intended for use with the Silverlight platform.

The presentation logic is divided between run-time and design-time. At design time a tool is used to create a graphical representation of the application flow using the Activities layer 140 and the workflow. The workflow is comprised of a number of linked activities as will be described. This encapsulates the application logic and uses declarative rules to decide the flow of the applications. Specialised property editors, validity checking and tracking services may also be provided in this tool.

The tool produces XOML files (shown in layer 150) which are fed to the workflow engine or compiled into dlls (dynamic link libraries). The workflow engine and the workflows are hosted by a workflow host which resides on the mid-tier. This is not essential and the workflow host could reside on the client. The Activities in the Workflow communicate with business services 160 which are resident on the mid-tier via SOAP (Simple Object Access Protocol) which is an XML based protocol designed to allow web based applications to exchange information.

Data services 170 also form part of the mid-tier and are resident on it. In the case of a self-service kiosk, there is only exchange of data to the client from the user and the client can only read data; it cannot update it. The client can communicate with the data services via REST (Representational State Transfer) messages although other communications protocols such as Xpath or related technologies may be used. This simplifies the programming as the application merely asks for the piece of data it needs. The messages are lightweight and the mid-tier is very loosely coupled from the client. The data service, as well as providing traditional airline data may connect to external web-services to provides other data, such as travel related data including weather reports.

The host abstraction layer is indicated at 180 and gives the application access to airline systems departure control systems. This layer is important as it makes the application independent of any particular system. The host abstraction layer hides the complexity of host protocols from the rest of the system and abstracts the host system so that the same components can be deployed to different hosts without change. Changes to a host, or the addition of a new host, do not necessarily imply that there should be a new release of the host abstraction layer, other than a new connector if it is a new transport protocol. Instead, the layer acts as an interpreter and uses scripts and/or schemas to manage the different hosts and protocols.

In use, the software system will be adapted by customers to suit their particular needs. Business analysts will determine with the customers the particular functionality they require, the user interface flows and any specific customisation. User interface designers will design the screens and the branding which are displayed to the user. By providing a componentised architecture, these tasks can be carried out in parallel to reduce the development time and improve the time to market greatly.

By capturing complex, generic, behaviour inside component interfaces, customisation can be greatly facilitated. The application developer can then use these interfaces to assemble applications and customisations without requiring knowledge of low level details.

The principles of the software architecture will now be described. The architecture divides the system into three component types: Complex, Generic and Custom. This division aids in providing a system that can bring a solution rapidly to market. The Complex components absorb the complexity of the system within high level interfaces. These are usually developed using low-level system programming skills and in-depth technical domain knowledge. Examples of Complex components include the host abstraction layer and the device abstraction layer.

Generic components encapsulate common functions for a particular domain with a focus on reusability. These are components that any application is likely to want to use and which can simply be selected by the developer without the need for any coding. In our self-service kiosk example, a printer function is a good example of a generic component. It will always be required to print boarding passes and by providing a generic printer function, the developer can simply select that function to achieve the functionality. Generic components must be cohesive so that they perform a single well defined task completely. Thus in the printer example, the printer function will print the document while informing the user of the progress of the print. It will then complete the task with a result when the print has finished. These components may be parameterised or further componentised to enable greater re-usability. By developing generic components within each domain within a framework, the high level design will be the same. Once the framework and wizards are developed, new re-usable components can be created rapidly. Developers of generic components require mid-level programming and technical skills and some business focussed domain knowledge. The generic components include screens and application services.

Custom components will be unique to each user and may be developed rapidly in response to business requirements. Custom components may be produced without creating any new coding by the developer who is provided with the appropriate tools, frameworks and reusable components. The main tasks for the business application developer are a business process model including rules and the user interface design.

A common data model is used in conjunction with the host abstraction layer. All parameters to the services are strings which are serialised and de-serialised by the application using a shared schema. The data is specified using schema and the process of specifying the data is iterative. In the example of the self-service kiosk, schemas are provided for:
  Access to departure control systems;
  Workflow—the schemas that the workflow uses internally;
  Workflow session—the schemas for the data set that is used during a session. This is data that is gathered from the user, form the departure control system and from other web services;
  Workflow configuration—the workflow configuration data which sets the Workflow properties and is passed to the workflow when the workflow is started;
  SL (Silverlight) Application Data—this data is passed to the SL application when the transaction workflow is started.
  One example of these schemas is:
  Workflow data example: Screen Specification
  Workflow session data example: Current flight
  Configuration data example: Services Offered
  SL application data example: Theme Thus, all data in the system is specified by schema and where the data is accessed by objects, those objects should be generated using an automated tool (xsd.exe). The data model is not created for the system but rather it is built up from the inputs to the system either from the end-user or from web services. So the data model of the application is the sum of all the inputs to the application. Therefore the data model is automatically extended when there is a new input to the system.

The data schema specifies the data format of the session data. The values of this schema are set during runtime execution of the workflow. The values are accessed via xpath which is the path through the schema to the value that is to be set or read. The data schema encompasses all data returned from the services or supplied by the customer during execution of the Transaction workflow.

The workflow path schema specifies the format of the path through the workflow to the workflow properties. The workflow path is used to point to the properties in the workflow. The workflow contains Scenarios, each Scenario being an Activity which contains Activities. Both Scenarios and Activities can have Properties that can be navigated to using the path through the Workflow. Activities have unique identifiers within a Scenario.

Screens may preferably be developed in XAML or HTML, although any other presentation language may be used. The code behind the screen is generic that responds to user interface (UI) events from the screens and sends to the workflow. The UI events may be from a device. All screens are viewable and editable in Expression Blend.

Each screen has an XML specification. This specification is used by the designer for presentation and validation.

The schema elements are:
Screen Name (1)
Required Properties—"key=value" (0-*)
Optional Properties—"key=value" (0-*)
Range of Return Values (1-*)
Return Data—"key=value" (0-*)
Pre Conditions (0-*)
Post Conditions ( )-*)
Description of behaviour.

The device is a Silverlight User Control which can be placed on the Silverlight toolbar and can be dragged and dropped onto the page. The device controls have properties that can be set at design time or at run time.

The embodiment described provides an approach to creating applications which can be assembles rather than coded. The workflow of the application is modelled using a graphical tool and screens and services are described using schema. The tool uses these schemas to guide the developer.

XML schema are used for all data and messages enabling the data model and/or the messages to be extended by the user by updating the schema in a backwards compatible manner.

High level interfaces are provided to devices which are accessed via user interface elements. The devices can be drag and dropped onto pages and properties set on them. Pages are GUI screen representations and are developed using a GUI screen tool. They may be specified declaratively in an XML language such as XAML.

In the example described of a self-service check-in kiosk, access to external systems, in this case airline systems, is via a service interface accessed via the GUI tool. This tool and a service interface can also be used to access other external systems such as targeted marketing, payments and advertising.

The business rules are also declarative and incorporated into the workflow via the GUI tool.

The entire system may be advantageously executed in a development environment on a PC using host and device simulators. At runtime the behaviour of the application can be adapted by supplying new configuration parameters. The workflow can accept new parameters on each occasion with needing to restart the system.

The example described is a self-service check-in kiosk for an airline. Of course the principles of the invention are not limited to self-service check-in but extend to other check-in scenarios such as mobile check-in, agent based check-in and web-based or on-line check in. Moreover although the check-in described is intended for airline check-in, the invention is applicable to check-in systems intended for any type of travel and even non-travel events. An example of the latter is sports or entertainment events where the user, having already acquired a ticket, is required to authenticate themselves to gain access to the event. This may be by supplying a booking reference and a credit card identification following which an entrance ticket will be printed. This is in effect, very similar to a boarding card. Embodiments of the invention may also be used for hotel check-in systems.

The invention is also applicable more broadly, for example in the financial industry in situations where a large number of legacy systems have evolved over years. One example is Automated Teller Machines (ATMs) which presently are provided by many different banks, each of which has their own code base.

The invention is suitable for any self service transactional application in many industries. The financial services also face a proliferation of channels, customers that range from large multi-national to small regional banks, who seek to differentiate themselves via the self service channel and also are looking for revenue generating opportunities on that channel.resulting in many application code bases and the problems that result therefrom.

In the financial self service environment the customer uses a self service terminal, similar to an airline kiosk. Some non-cash self service terminals are kiosks. Others are kiosks with the addition of a safe which holds cash or other valuable media. The customer is authenticated via the card reader and encrypting pin pad devices. The user is authenticated by a financial host system. When authenticated, the customer will be able to perform transactions on that terminal, including depositing and receiving cash and documents. These transactions have varied business rules depending upon, for example, the bank, the location of the terminal, the customer, or the time of day. This variety results in the need for many different code bases. An embodiment of the present invention applied to such self service terminals and as described above uses a single code base which could be assembled and configured into many applications without writing code. A workflow with declarative rules controls the flow and XAML pages make up the presentation layer. In the financial industry there are varied host protocols and specialized device interfaces. Therefore the host abstraction layer and the device abstraction layer are necessary to absorb this complexity in the same way as they are required for the airline example described above.

In order to understand the manner in which an embodiment of the invention operates, the workflow designer will now be described in greater detail.

Figure 2:
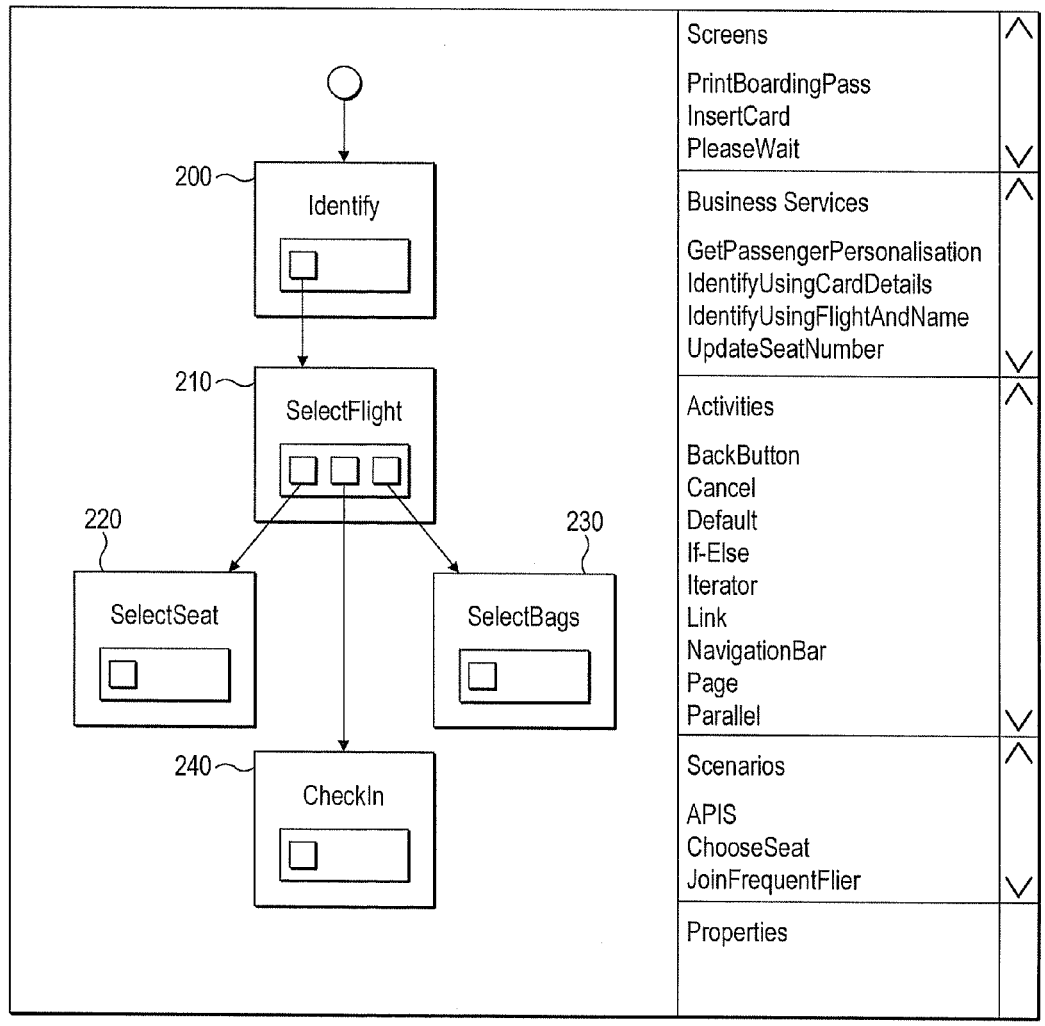
FIG. 2 shows an example graphical user interface for a workflow designer.

FIG. 2 shows the user interface of the workflow designer used to develop the application for a specific installation. The designer includes a GUI object representation of the workflows and activities but not the actual activity objects. The designer creates the workflow programmatically and converts it to an XOML file which is a declarative XML workflow file. Thus in FIG. 2 the object Identify 200 is linked to the object Select Flight 210. That object is in turn linked to the objects Select seat 220. Select bags 230 and Check in 240. At the right hand side of the screen are displayed the Screens. Business Services, Activities and Scenarios that are available. When the user clicks on one of them, the specification, as described by their schema, and help is displayed to the user. The user can than drag and drop the Screens or Business Services onto a page and the activities and the Scenarios into the workflow. The user does not need to create any code in these steps.

Figure 3:
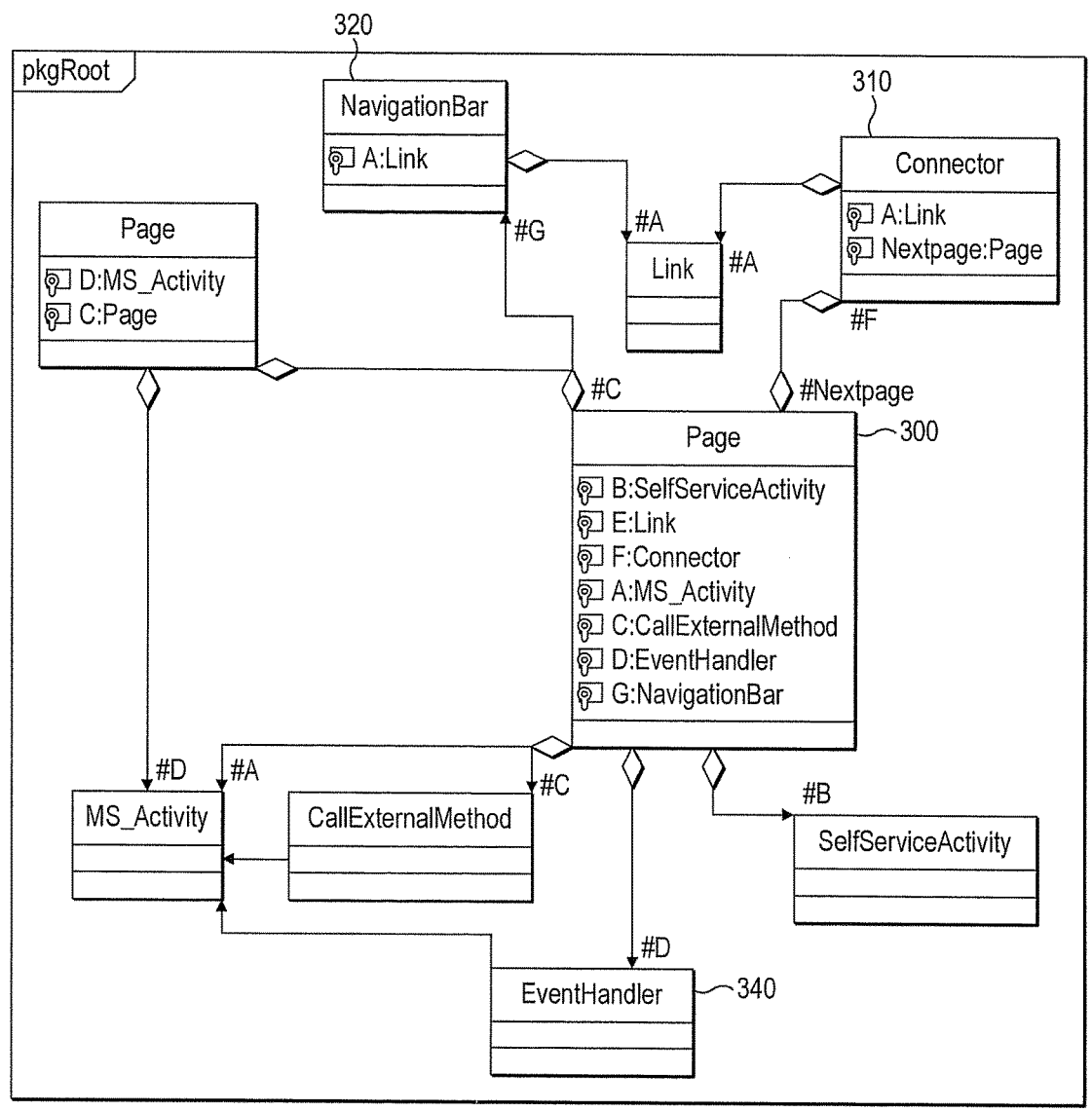
FIG. 3 shows the various activities associated with a page and the links to other activities and pages.

The Workflow contains Scenarios, Pages and Activities. As can be seen from FIG. 3, page is a composite activity. FIG. 3 is a UML object model showing the relationship between activities. Pages are joined by connectors 310 which consist of a link and a destination page. Thus in figure three the page bar 300 has associated activities A to G. The page contains a navigation bar 320 (activity G) which contains the links. The links (Activity E) have a condition property, which is evaluated and if true flow continues to the destination page of the connector. The links are evaluated from left to right across the Navigation bar. Pages that communicate with the client are implemented using a Call External Method Activity 330 (Activity C). An Event Handler activity 340 (activity D) receives the event from the client application. When the event is received the link conditions will be evaluated. These pages are client pages.

Pages that communicate with the services are implemented using an Invoke Web Service Activity. When the Web Service returns the link condition will be evaluated. These pages are Service Pages. A specialised Iterator Activity iterates over a list and a Set Value Activity sets a value of the Session data.

On the client page the designer has a menu option 'Add Screen' which navigates the user to an XAML file for the screen. The designer leads the user through the necessary steps to add the additional information required such as Pre Conditions, Post Conditions and Return Data Path. The designer then generates the appropriate XML document using the Screen Schema. The Client page sends a message to the client application as specified by the Message Schema. The message contains the name of the screen to show and any properties to set on that screen. The client page will receive an event from the client containing the result and any returned data.

The services page contains a Business Service. The designer has a menu option 'add service' which navigates the user to a WSDL file for the Business Service. The user then provides the necessary additional information including Pre Conditions, Post Conditions and Return Data Path and the designer can then generate an XML document using the Service Schema A pre-condition refers to the data that must be set, that is obtained and validated before the activity can be performed. A post-condition is the data that will be set when the activity completes successfully.

Pre and post conditions allow a flow to be validated, that is it can be determined at design time that an activity will only be activated if its' preconditions are met.

Scenarios are composite Activities and can be invoked from the top level workflow at runtime. Scenarios may contain other scenarios and deliver large grained pieces of functionality such as 'Seat Map', 'Payment' and 'Join Frequent Flyer'. Scenarios can have properties which can be accessed by contained Activities and have Navigation Bars with Links.

The purpose of Scenarios is to simplify the display of large applications into manageable chunks and to provide reusable pieces of functionality which can be imported into other projects.

Scenarios are analogous to function calls in coding and no a change to a scenario in one part of the application will be propagated to the same scenario elsewhere. As it is desirable to improve reusability scenarios can be parameterised with properties which can be referenced by the internal Activities and Scenarios.

The elements of session data can be accessed by using xpath expressions. Xpath is used to navigate through elements and attributes in an XML document. A specialised Activity Set Value can be used to set values within the Session data.

A Page Property is set within xpath to send Session Data values to the client or business service. An example is to send a selected seat to a Change Seat business service. The Change Seat interface is result Change Seat (string passenger, string flight Number, string seat Number). The properties could then be set as follows:

"passenger"="Session Data/Current Selection/Current Passenger"

"flight Number"="Session Data/Current Selection/Selected Seat"

"seat Number"="Session Data/Current Selection/Selected Seat"

The Session data can be updated if the workflow is receiving data from the client or business. For example the presentation page named Seat Selection links to the Select Seat screen on the client and the Select Seat screen returns "Seat=4G". The designer has provided a "Seat" property from reading the xml for the Select Seat screen and updates that property with "4G". For all return values there is an option of using a specialised editor which enables the developer to navigate the session schema and connect the Seat Selection schema element to the Seat property of the Seat Selection Activity. Thus, the session data is updated when the Sear property is set to "4G".

Figure 4:
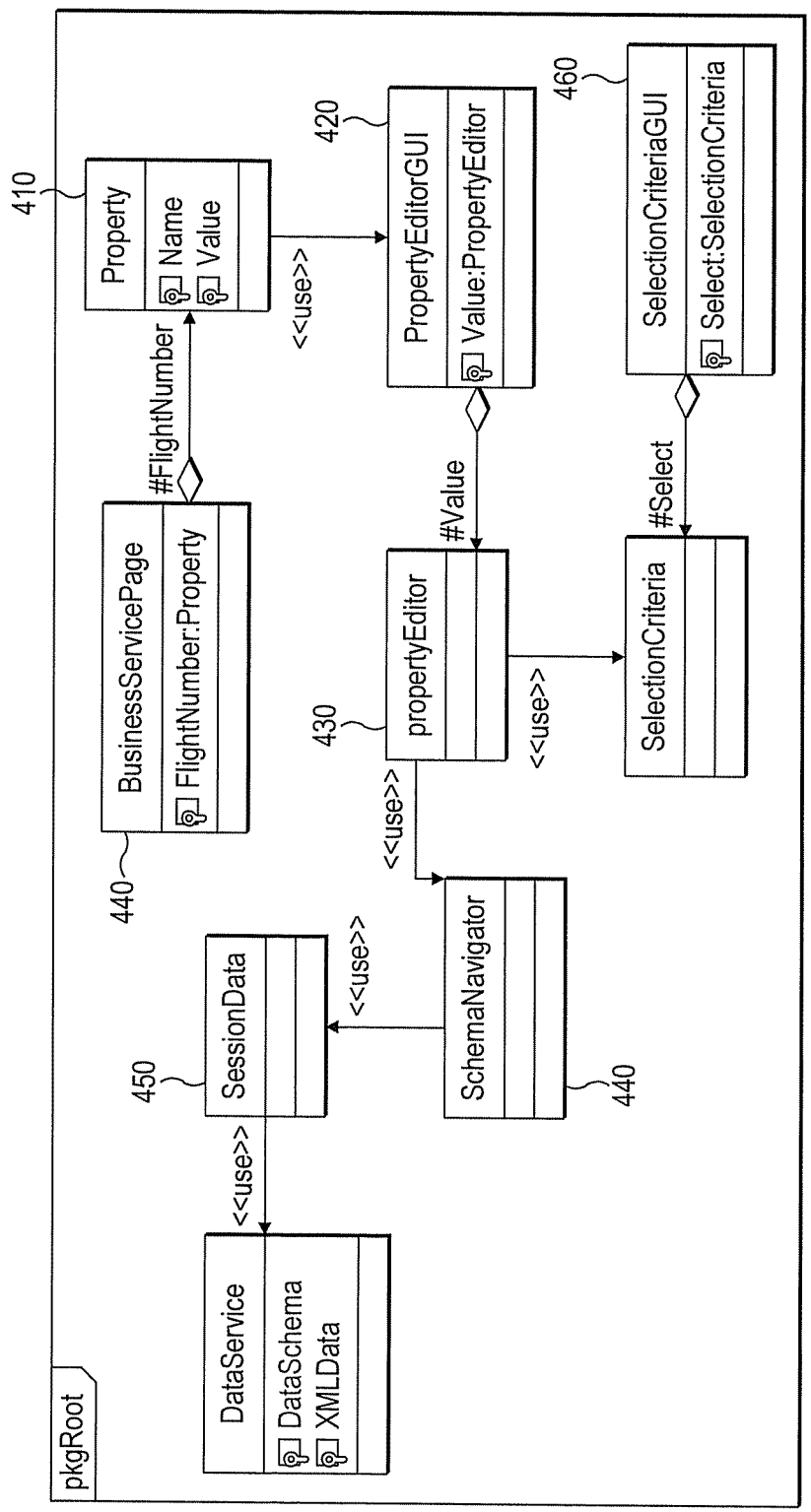
FIG. 4 shows how data values may be accessed by a business service page.

Referring now to FIG. 4, the accessing of data values will be explained. The Service Page 400 has a Property. This Property 410 is automatically added to the Page by the Designer when a Business Service is dragged and dropped onto the page. The Property matches a parameter in the service call. To help rapid development the name of the Property matches an element of the Session Data and the Designer automatically sets the value of the Property to the path in the data schema. This default behaviour can be overridden by the Designer by entering a string value for the Property and using a Property Editor GUI 420 to navigate to the appropriate place in the Session Data 450. The Properly Editor 430 uses a schema navigator 440 to navigate the Session Data 450. It is also possible to select from a list using a Selection Criteria GUI 460. This GUI enable the Developer to navigate to other properties in the workflow.

When a Screen or Business Service is dropped onto a page, the designer will automatically insert Return Data properties according to the schema. For services the return data is a string but the schema that the designer uses extends the WSDL to map the return data to a path in the Session Data.

To aid the developer the Return Data property value is automatically set to the path specified. The return data may be a complex type but the data schema type is made compatible with the services schema type to avoid the need for internal mapping. If an internal mapping is required the mapping will be contained in the services schema for that Business Service. The type compatibility will be validated as part of design time validation.

The Designer checks for errors from the Web Service and set the Status accordingly. In the case of error the session data does not get updated. Values within the Session Data can also be updated by the developer using the Set value Activity. This Activity allows the developer to override any value within the Session Data with an alternative value.

The validator ensures that all required properties are set and that all return values cause a transition. It validates before a Service Page or Client Page is activated and its specified preconditions have been met.

The values of the workflow dependency properties can be edited by the configuration tool. The tool creates a dictionary object (path=value) which will be passed to the workflow runtime when the workflow is executed. This will dynamically set Workflow properties. Workflows are developed with default properties which can be updated at runtime by the dictionary configuration object.

To create these Configuration files the developer will edit the properties of the workflow. This is done by choosing a menu item 'New . . . Configuration'; and associating the Configuration with a workflow. The configuration tool opens a designer window containing the workflow and the designer constrains updates to only dependency property updates. The developer then edits the workflow properties to create a new configuration. The developer can use the schema navigator tool to set values to Session Data properties and can edit the condition property (rules). The configuration tool creates a path=value pairs for the dictionary configuration object Workflow.Scenario.Property.Attribute=string.

The tool will automatically import WSDLs and enable the application to connect to any web-service without coding. The screens on the client are specified using XML schema and are analogous to the WSDLs, the tool will automatically import the screen specification and enable the screen to be shown at any point in the workflow. The tool provides for declarative business rules and the tool will automatically extend the application data mode.

In these ways the tool can integrate web-services, screens and extend the data model, modify or add business rules without writing code.

Various modifications to the embodiments described are possible and will occur to those skilled in the art without departing from the invention which is defined by the following claims.

The invention claimed is:

1. A method of developing a software application in which a check-in terminal communicates with two or more airline systems and services, the method comprising:
providing a common code base to a computer system, wherein the common code base is incompatible with the two or more airline systems and services;
describing data and messages used by the application using a declarative data description language;
defining a library of system components, stored in a store of the computer system, including:
a) a terminal abstraction layer that allows interactions between the check-in terminal and the application to control the check-in terminal; and
b) an airline systems and services abstraction layer that allows interactions between the two or more airline systems and services and the application, wherein the two or more airline systems and services comprise check-in systems;
providing a graphical (GUI) tool to model the workflow of the application, the workflow including screens and services described declaratively by a declarative data description language, the graphical tool being for display on a display device of the computer system; and
assembling the application using the graphical tool, declarative rules, and customizations of system components selected from the library.

2. A method according to claim 1, comprising defining user interface elements for accessing the check-in terminal, whereby the user interface elements can be dragged and dropped onto pages of composite activities using the graphical tool.

3. A method according to claim 2, wherein the pages are screen representations and are specified declaratively.

4. A method according to claim 1, wherein the graphical tool provides access to the two or more airline systems.

5. A method according to claim 1, wherein business rules are incorporated into the workflow using the graphical tool.

6. A method according to claim 1, wherein the library of system components comprise complex, generic and custom components.

7. A method according to claim 1, wherein at least one of the data and messages used by the application or the screens and services are described using XML schemas.

8. A method according to claim 1, wherein the data and messages described using a declarative data description language are at least partially provided from a library of data and messages.

9. A method according to claim 6, wherein the generic components comprise re-usable components for a domain, and comprising parameterizing at least one generic component to increase re-usability.

10. A method according to claim 6, wherein the custom components are created without coding by a developer.

11. A method according to claim 1, comprising defining a common data model, the data model having data specified using schemas.

12. A method according to claim 11, wherein the data schemas specify a data format of session data and values of the schemas are set during runtime execution of the workflow.

13. A method according to claim 1, wherein the application is a check-in client.

14. A method according to claim 13, wherein the check-in client is a self-service check-in client.

15. A method according to claim 14, wherein the self-service check-in client is a web based application.

16. A method according to claim 1, wherein the check-in terminal comprises a self-service kiosk.

17. A method according to claim 1, wherein the check-in terminal comprises an agent device.

18. A method according to claim 13, wherein the airline systems and services abstraction layer provides access for the application to the two or more airline systems and services.

19. A method according to claim 1, wherein the application is a ticketing client.

20. The method of claim 1, wherein the two or more airline systems and services further comprise at least one of the following: a baggage handling system, a ticketing system, or a departure control system.

21. A software application development tool for assembling applications in which a check-in terminal communicates with two or more airline systems and services, the software application development tool stored on non-transitory computer readable media and comprising computer readable program code comprising:
a common code base, wherein the common code base is incompatible with the two or more airline systems and services;
data and messages used by the application described using a declarative data description language;
a library of system components including:
a) a terminal abstraction layer that allows interactions between the check-in terminal and the application to control the check-in terminal; and
b) an airline systems and services abstraction layer that allows interactions between the two or more airline systems and services and the application, wherein the two or more airline systems and services comprise check-in systems;

a graphical (GUI) tool to model the workflow of the application, the workflow including screens and services described declaratively by a declarative data description language; and an assembler for assembling the application using the graphical tool, declarative rules, and customizations of the system components selected from the library.

22. A software application development tool according to claim 21, comprising user interface elements for accessing the check-in terminal, whereby the user interface elements can be dragged and dropped onto pages of composite activities within the graphical tool.

23. A software application development tool according to claim 22, wherein the pages are screen representations and are specified declaratively.

24. A software application development tool according to claim 23, wherein the pages are specified in an XML language.

25. A software application development tool according to claim 21, wherein the graphical tool provides access to the two or more airline systems.

26. A software application development tool according to claim 21, comprising business rules specified declaratively and available for incorporation into the workflow using the graphical tool.

27. A software application development tool according to claim 21, wherein the library of system components comprise complex, generic and custom components.

28. A software application development tool according to claim 21, wherein at least one of the data and messages used by the application or the screens and services are described using XML schemas.

29. A software application development tool according to claim 21, wherein the data and messages described using a declarative data description language are at least partially provided from a library of data and messages.

30. A software application development tool according to claim 27, wherein the generic components comprise re-usable components for a domain, and wherein at least one generic component is parametered to increase re-usability.

31. A software application development tool according to claim 27, wherein the custom components are created without coding by a developer.

32. A software application development tool according to claim 21, comprising a common data model, the data model having data specified using schemas.

33. A software application development tool according to claim 32, wherein the data schemas specify a data format of session data, and values of the schemas are set during runtime execution of the workflow.

34. A software application development tool according to claim 33, wherein the graphical tool provides a GUI object representation of workflow and activities which are converted to a declarative XML workflow by a workflow designer.

35. A software application development tool according to claim 21, wherein the application is a check-in client.

36. A software application development tool according to claim 35, wherein the check-in client is a self-service check-in client.

37. A software application development tool according to claim 36, wherein the self-service check-in client is a web based application.

38. A software application development tool according to claim 21, wherein the check-in terminal comprises a self-service kiosk.

39. A software application development tool according to claim 21, wherein the check-in terminal comprises an agent device.

40. A software application development tool according to claim 35, wherein the airline systems and services abstraction layer provides access for the application to the two or more airline systems and services.

41. A software application development tool according to claim 21, wherein the application is a ticketing client.

42. A non-transitory computer readable media carrying a software application in which a check-in terminal communicates with two or more airline systems and services, the application being developed by the steps of:

providing a common code base, wherein the common code base is incompatible with the two or more airline systems and services;

describing data and messages used by the application using a declarative data description language;

defining a library of system components including:
  a) a terminal abstraction layer that allows interactions between the check-in terminal and the application to control the check-in terminal; and
  b) an airline systems and services abstraction layer that allows interactions between the two or more airline systems and services and the application, wherein the two or more airline systems and services comprise check-in systems;

providing a graphical (GUI) tool to model the workflow of the application, the workflow including screens and services described declaratively by a declarative data description language; and assembling the application using the graphical tool, declarative rules, and customizations of system components selected from the library.

* * * * *